Figure 1:
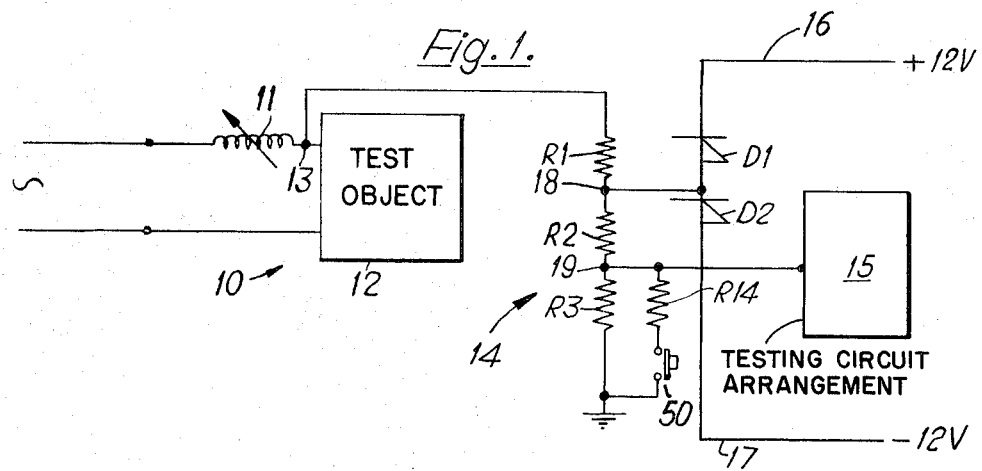

United States Patent [19]
Jenkins

[11] 3,763,399

[45] Oct. 2, 1973

[54] HIGH VOLTAGE SERIES RESONANT TESTING CIRCUIT ARRANGEMENTS

[75] Inventor: Raymond Vaughan Jenkins, Oldham, England

[73] Assignee: Ferranti Limited, Hollinwood, Lancashire, England

[22] Filed: Aug. 17, 1972

[21] Appl. No.: 281,480

[52] U.S. Cl.................. 317/31, 317/50, 324/51, 324/102
[51] Int. Cl...... H02h 3/02, H02h 3/22, G01r 19/04
[58] Field of Search...................... 317/27 R, 31, 50; 324/51, 102, 103 R, 103 P, 140 D

[56] References Cited
UNITED STATES PATENTS

| | | | |
|---|---|---|---|
| 3,593,133 | 7/1971 | Wisner | 324/103 R |
| 3,225,213 | 12/1965 | Hinrichs et al. | 324/103 P |
| 3,379,934 | 4/1968 | Hoel et al. | 317/27 R |
| 3,510,688 | 5/1970 | Andersson et al. | 324/103 R |
| 3,519,884 | 7/1970 | Paddison et al. | 317/27 R |
| 3,525,040 | 8/1970 | Rolfe | 324/103 R |

Primary Examiner—A. D. Pellinen
Attorney—Gordon W. Daisley

[57] ABSTRACT

A testing circuit arrangement repetitively stores voltages representative of the peak values of adjacent half cycles of an alternating testing signal and compares each newly stored peak value with a predetermined fraction of the stored immediately preceding peak value (of the opposite polarity). The voltage associated with the longer stored peak value is cleared after each comparison has been made and before the next peak value of that polarity occurs; and if a fall in successive peak values, by the predetermined fraction, has occurred at the time when the stored voltage is cleared, the test is halted.

6 Claims, 5 Drawing Figures

HIGH VOLTAGE SERIES RESONANT TESTING CIRCUIT ARRANGEMENTS

This invention relates to circuit arrangements and in particular to circuit arrangements for use in high voltage series resonant testing.

Many circuits are in existence for determining changes in amplitude and/or frequency of an alternating waveform but are relatively slow in operation, that is, take one or more cycles of the waveform to operate. In normal high voltage a.c. testing of capacitors, cables, and transformers, it is usual to detect an electrical breakdown in the test object by means of a current-sensitive relay in the supply line, which relay cuts off the supply to the test object upon any unacceptable increase in current being detected.

A relay cannot be used successfully in a high voltage series resonant test, in which test the reactance of the test object is tuned with an external reactance to form a resonant circuit. In this test, a relatively low alternating supply voltage is caused to rise by resonance to a much higher value, which value may be sufficient to cause breakdown of the insulation of the object. If breakdown does occur the resonant test voltage falls off sharply, without a rise in current; but, after a few cycles of the supply, the voltage begins to increase to resonance, and breakdown again takes place. This form of breakdown is normally only detectable after several occurrences of breakdown have already taken place, and the test object may have been damaged.

It is an object of the present invention to provide a high voltage series resonant testing circuit arrangement in which an abrupt change in the characteristics of a predetermined alternating signal is detected in less than one cycle of the signal.

According to the present invention a high voltage series resonant testing circuit arrangement comprises storage means responsive to an applied alternating signal for repetitively storing together at least two successive peak values of half cycles of the alternating signal, comparator means for comparing the ratio of a stored peak value of a half cycle to that of the stored immediately preceeding half cycle with a predetermined fraction, and output means operably coupled to the comparator means to provide an output signal in response to the detection of such a ratio of peak values of less than the predetermined fraction.

Figure 3:
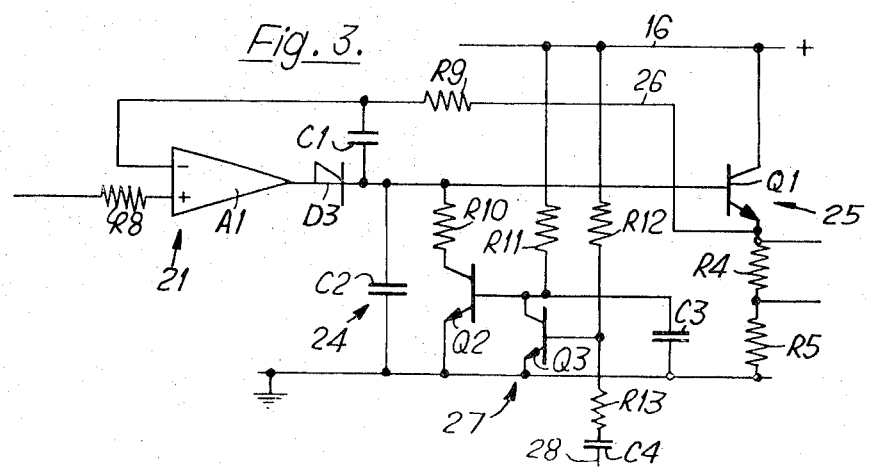
Figure 4:
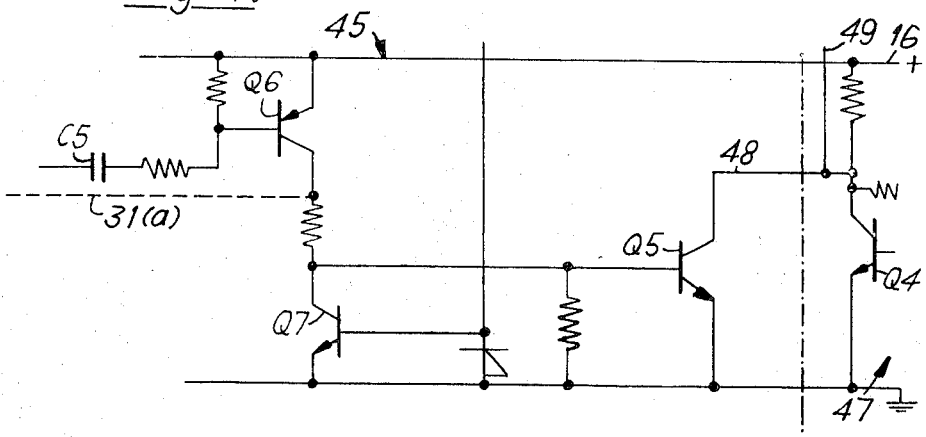
Figure 2:
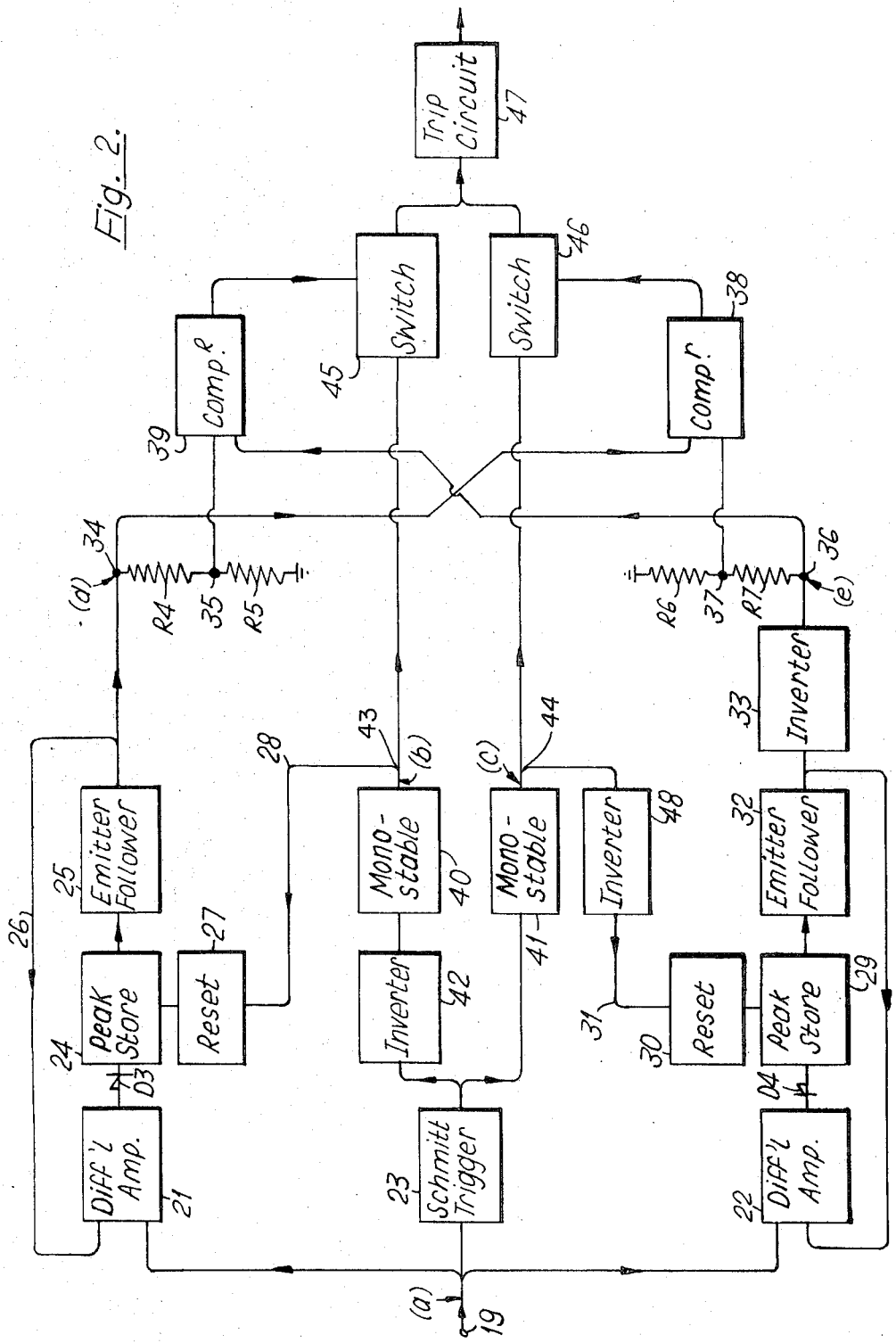
Figure 5:
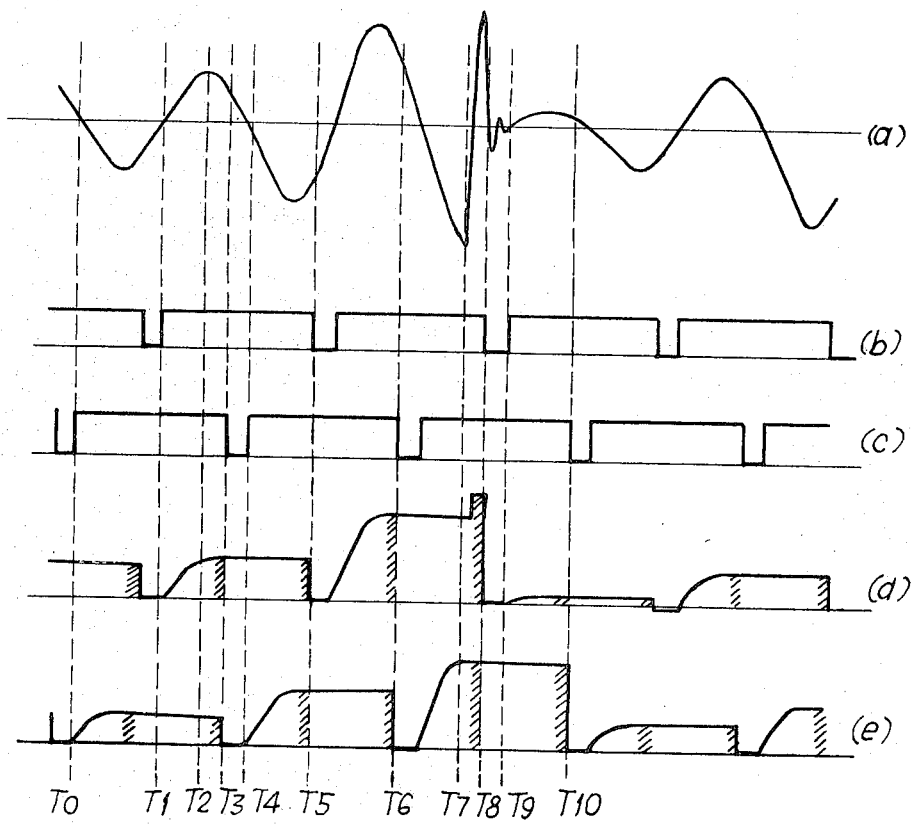

The present invention will now be described by way of example with reference to the accompanying drawings, in which FIG. 1 shows an interface between a resonant circuit and a testing circuit arrangement, FIG. 2 is a block diagram of one embodiment of a testing circuit arrangement according to the present invention, FIG. 3 and FIG. 4 are circuit diagrams of parts of the circuit arrangement of FIG. 2, and FIG. 5 illustrates waveforms of voltages at various points in the testing circuit arrangement plotted against time.

Referring to FIG. 1, a resonant circuit 10 comprises a reactance element 11 connected to a test object 12, such as a capacitor, cable, or transformer. The resonant circuit receives its power from a high voltage mains-derived supply, and is tapped at 13 by a potential divider network 14 comprising resistors R1, R2 and R3. The potential divider network 14 provides from a terminal 19 an input signal for a testing circuit arrangement 15 shown in block diagram form in FIG. 2, the divider comprising an interface between the resonant circuit 10 and the testing circuit arrangement 15.

Referring to FIG. 1, the testing circuit arrangement 15 is of a low voltage transistorized type receiving its power from ± 12 volt supply rails 16 and 17 respectively. To protect the components of the testing circuit arrangement 15 from excessively high voltages from the resonant circuit, two diodes D1 and D2 are connected in series between the supply rails 16 and 17 in a reverse biased sense. The point between the diodes is connected to the potential divider network 14 at the junction 18 of the resistors R1 and R2. The voltage at the point 18 is by this arrangement limited to a maximum swing of ± 12 volts, any voltage in excess of this level being conducted through one of the diodes D1 or D2. The point 19, at the junction of resistors R2 and R3, provides the input signal to the circuit arrangement 15. The values of the resistors R1, R2 and R3 are chosen so that the point 18 normally operates between approximately ± 0.5 volt.

Referring now to FIG. 2, the signal voltage at the point 19 is fed to the non-inverting inputs of differential amplifiers 21 and 22 and to the input of a Schmitt trigger 23. The output signal from the differential amplifier 21 is rectified by a diode D3, so that the positive part of the output is passed to storage means 24 where the peak value of the positive part of the input signal is stored. This stored value is passed to an emitter follower 25 where it is represented by a voltage equal in magnitude across a potential divider formed by load resistors R4 and R5. Negative feedback is taken from the emitter follower to the inverting input of the differential amplifier 21 by a line 26. The peak value stored in the storage means 24 is removed by clearing or reset means 27, operated for a short period of time by a short duration pulse received along the line 28. This part of the circuit will be described in detail hereinafter.

The negative part of the input signal passes through a similar, but complementary, circuit involving the amplifier 22, diode D4, storage means 29, reset means 30, triggered by a pulse on the line 31, and an emitter follower 32; in this case, however, the peak negative value of the input signal stored is inverted by an inverting amplifier 33 and is represented by a positive voltage across a potential divider formed by resistors R6 and R7.

The voltage across the two resistors R4 and R5, that is, between a point 34 and earth, is equal in magnitude to the peak value of the positive part of the input signal at the point 19. The resistors R4 and R5 are of equal value so that the voltage at the junction 35 of the resistors is half the magnitude of the peak value of the positive part of the input signal. The voltage across the two resistors R6 and R7, that is, between the point 36 and earth, is equal in magnitude to the peak value of the negative part of the input signal. The resistors R6 and R7 are also of equal value, the voltage at the junction 37 of these resistors being half of the magnitude of the peak value of the negative part of the input signal at the point 19. Comparators 38 and 39, comprising differential amplifiers, compare the voltages at the points 34 and 37, and at 36 and 35, respectively. The output of the comparator 38 indicates any difference in voltage between the point 34 and 37, and gives a negative output voltage when the magnitude of the voltage at 37 exceeds that at 34. Similarly, the comparator 39 gives a negative output voltage when the magnitude of the voltage at 35 exceeds that at 36. Under normal non-resonant operating conditions it may be expected that the peak value of a positive part of the input signal is equal to the peak value of the negative part of the input signal so that the voltages at the points 34 and 36 wll be equal and the voltages at the points 35 and 37 will be equal. This means that the comparators 38 and 39 normally give a positive output. However, if the insulation in the test object breaks down the voltage at the point 34 becomes less than that at the point 37, or the voltage at the point 36 becomes less than that at 35, that is, the voltage at the point 34 or 36 becomes less than half its normal value. The result of this is that the appropriate comparator produces a negative output, the significance of which will be apparent from the description hereinafter.

The timing of the storage and comparison functions and the clearing means of the testing circuit arrangement is controlled by two identical monostable multivibrators 40 and 41. As stated previously, the input signal at the point 19 is fed to the Schmitt trigger 23, which produces a square wave of the same repetition frequency as the input signal. This square wave output is fed directly to a trigger of the multivibrator 41 and by way of an inverting amplifier 42 to a trigger of the multivibrator 40. These circuit elements are arranged such that the positive going part of the input signal triggers the multivibrator 40 into its unstable state and raises its output voltage, at the point 43, from zero to a positive value, while the negative going part of the input signal triggers the multivibrator 41 into its unstable state and raises its output voltage, at the point 44, from zero to a positive value.

The outputs of the multivibrators 40 and 41 are fed to the output means comprising identical switching circuits 45 and 46 respectively, described in detail hereinafter, to which switching circuits and outputs of the comparators 39 and 38 respectively are also fed. The switching circuits 45 and 46 together with a trip circuit 47 comprise output means for the circuit. A negative output voltage from the comparator 39 primes the switching circuit 45 while the multivibrator 40 is in its unstable state. When the multivibrator 40 produces a negative going pulse of short duration at the switching circuit 45, said pulse operates the trip circuit 47. The trip circuit 47 operates a contactor (not shown), and removes the supply from the resonant circuit 10. If the output voltage from the comparator 39 is positive, the switching circuit 45 is not primed and the pulse from the multivibrator 40 does not operate the trip circuit 47. Independently of the polarity of the output of the comparator 39, the trailing edge of the pulse, as the multivibrator 40 returns to its stable state, causes the switch 27, connected to the point 43 to operate for a short period of time and so removes the peak value of the positive part of the input signal from the storage means 24. A similar function is performed by the multivibrator 41, the comparator 38 and the switching circuit 46, causing operation of the trip circuit 47 if the comparator 38 has a negative output voltage when the multivibrator 41 returns to its stable state. The switch 30, however, requires a positive going pulse for operation and this is formed by inverting the negative going output of the multivibrator 41 in an inverting amplifier 48.

The part of the circuit of FIG. 2 comprising the amplifier 21, storage means 24, switch 27 and emitter follower 25 is shown in detail in FIG. 3.

The differential amplifier 21 comprises an operational amplifier A1 having inverting and non-inverting inputs with input resistors R8 and R9 and stabilizing capacitor C1. The diode D3 in series with the output of the amplifier A1 passes only the positive part of the signal to the storage means 24 which comprises a capacitor C2, connected between the output line of the amplifier A1 and earth. The rectified output of the amplifier A1 is also connected to the base of a transistor Q1 connected as an emitter follower and which is able to produce the voltage stored across the capacitor C2 also across the potential divider formed by load resistors R4 and R5. Negative feedback for the amplifier A1 is taken from the emitter of the transistor Q1 to the input resistor R9. The emitter follower prevents the resistors R4 and R5 and the following circuitry from discharging the capacitor C2, which capacitor is therefore able to remain charged at the highest voltage applied, that is, the peak value of the positive part of the input signal at the point 19.

Clearing of the storage means 24, that is, discharging of the capacitor C2, is achieved by means of the switch 27 which comprises a transistor Q2, connected in parallel with the capacitor C2, a transistor Q3 and bias and current limiting components comprising resistors R10, R11, R12 and R13 and capacitor C3. The transistor Q3 is biased by resistors R11 and R12 into a normally conducting state wherein the voltage between the collector of the transistor Q3 (and the base of the transistor Q2) and ground is almost zero, and is less than the base-emitter voltage required by the transistor Q2 for it to conduct. It has been stated previously that the storage means is cleared by the trailing edge of the pulse of the multivibrator 40 as it returns to its stable state. This negative going edge is applied to a capacitor C4 in the line 28 and is transmitted as a negative going pulse of short duration. This pulse is sufficient to reduce the bias voltage on the base of the transistor Q3 to a level at which the transistor is unable to conduct, thereby allowing the voltage on its collector and on the base of the transistor Q2 to rise and to cause the transistor Q2 to conduct. There is sufficient time before the end of the short pulse for the capacitor C2 to discharge completely through the transistor Q2. At the end of the short pulse, the transistor Q3 again begins to conduct and cuts-off the transistor Q2.

The part of the circuit for storing the peak negative values of the input signal at the point 19 is similar to that described above but uses opposite conductivity-type semiconductors and takes its power from a negative supply rail. The circuit then requires a positive going pulse to cause discharge of the storage capacitor.

The switching circuit 45 is shown in detail in FIG. 4, which figure also includes a part of the trip circuit 47. The trip circuit 47 comprises a bistable multivibrator having a normally energised relay coil in the collector lead of one transistor (not shown), and is activated by causing the collector of the other transistor (shown at Q4 in FIG. 4), to fall to a low voltage for a short period of time, thereby putting the multivibrator in its other stable state and de-energising the relay coil. The collector voltage of the transistor Q4 is made to fall by causing a transistor Q5, connected in parallel with the transistor Q4, to conduct. This entails supplying a positive base bias voltage to the transistor Q5 and is achieved by making a transistor Q6 conduct while preventing a transistor Q7 from conducting. The trailing edge of the pulse from the multivibrator 40 as the multivibrator returns to its stable state is applied to a blocking capacitor C5. This capacitor forms a negative going pulse of short duration on the base of the transistor Q6. The base is made negative with respect to the emitter so that the transistor conducts for the duration of the pulse and raises the voltage on the base of the transistor Q5 and on the collector of the transistor Q7 to a positive value. The base of the transistor Q7 is biased by the normally positive output voltage of the comparator 39 such that when the transistor Q6 is allowed to conduct for a short time, the transistor Q7 also conducts and pulls the base voltage of the transistor Q5 almost to zero and prevents it from conducting and operating the trip circuit. It is only under fault conditions when the comparator 39 gives a negative output voltage and the transistor Q7 is biased "off" that the transistor Q6 is able to cause the transistor Q5 to conduct and operate the trip circuit 47.

The components of the switching circuit 45 are identical to those of the switching circuit 46 but the transistor Q6 also acts as the inverting amplifier 48, the line 31 being taken from the collector of the transistor Q6 as shown by the broken line 31(a) in FIG. 4. The switching circuit 46 is connected to the trip circuit 47 by the connection 49 (shown in FIG. 4).

The sequence of operation of the testing circuit arrangement will now be described with reference to the graphical representations of waveforms of FIG. 5.

The waveform of FIG. 5(a) represents the variation of the input signal at 19 with time and shows how the signal amplitude increases to a resonance, the effect of insulation breakdown in the test object and how, if left undisturbed, the signal again builds up towards a resonance. The waveforms of FIGS. 5(b) and 5(c) represent the output voltages of the multivibrators 40 and 41 respectively with time, and the waveforms of FIGS. 5(d) and 5(e) represent the variations of voltage with time at the points 34 and 36 respectively. The positions where these waveforms occur in the circuit are indicated in FIG. 2 by corresponding letters (a), (b), (c), (d) and (e).

As described previously, the multivibrator 40 is triggered by the positive going part of the input signal at the point 19 and the component values are chosen to give it an unstable period of between three-quarters and one cycle of the input signal. The multivibrator 41 is triggered by the negative going parts of the input signal and has the same unstable period as the multivibrator 40. At a time T0, when the input signal begins a negative half cycle, the multivibrator 41 is triggered into its unstable state (FIG. 5(c)) where it remains until a time T3 before returning to its stable state. The voltage at the point 36 in FIG. 2 increases with the magnitude of the input signal (FIG. 5(e)) until the peak value of the input signal has been reached, where it remains constant until it is removed at the time T3 as the multivibrator 41 returns to its stable state.

Similarly at a time T1, when the input signal begins a positive half cycle, the multivibrator 40 is triggered into its unstable state where it remains until a time T5 before returning to its stable state. At the time T1 the voltage at the point 34 in FIG. 2 begins to increase in proportion to the magnitude of the input signal (FIG. 5(d)) until the latter reaches its peak value after which the voltage at the point 34 remains constant until the multivibrator 40 returns to its stable state at the time T5.

After a time T2, say, both of the points 34 and 36 have voltages equal to the peak positive and negative values respectively so that the outputs of the comparators 38 and 39 may then be used to prime switching circuits 46 and 45 respectively. As the only trigger pulse due a short time later at the time T3 is from the multivibrator 41, the switching circuit 46 and the comparator 38 are the only ones of interest at this time. The polarity of the output of the comparator 38 is equal to that of the voltage at 34 minus one half of the voltage at 36. Thus, providing the voltage at the point 34 is not less than half of the voltage at the point 36, the output of the comparator 38 will be positive and will not prime the switching circuit 46, and the return of the multivibrator 41 to its stable state at the time T3 will not cause the trip circuit 47 to operate.

At a time T4, some time after the time T3, the input signal again goes negative, triggering the multivibrator 41 and allowing the already cleared voltage at the point 36 to increase to the peak value of the negative part of the input signal where it remains until the multivibrator 41 returns to its stable state at a time T6. At a time T5, betwee the times T4 and T6, the voltage at the point 36 has reached its maximum and the polarity of the output of the comparator 39 is given by that of the voltage at the point 36 minus half of the voltage at the point 34. Under normal conditions this is a positive quantity as the voltage at the point 36 is not less than half of that at the point 34, and the switching circuit 45 is not primed; when the multivibrator 40 returns to its stable state at the time T5, the trip circuit is not caused to operate.

This sequence is repeated alternately, the multivibrators 40 and 41 alternately returning to their stable states, and each time half of the previously stored voltage being subtracted from the newly stored value, as at a time T6.

When a breakdown of insulation in the test object does occur, say at a time T7 in FIG. 5, the input signal returns rapidly to zero, overshoots with the opposite polarity (shown in FIG. 5(a) as being clipped at its upper limit by the diode D1), and then oscillates randomly about zero until at a time T9 the resonance again begins to form from a very low value. At a time T8, less than T9, when the multivibrator 40 returns to its stable state, the switching circuit 45 is primed according to the polarity of the voltage at the point 36 minus half of the voltage at the point 34. The rapid return of the resonant voltage to zero results in an overshoot in the form of a spike of opposite polarity. The magnitude of the spike is greater than the peak positive value held in the store 24, the stored value therefore increasing to the maximum value of the spike. Referring to FIG. 5(d) this is shown as occurring a short time after T7. If conditions are such that the voltage at the point 34 is more than twice the voltage at the point 36 then the output voltage of the comparator 39 is negative at the time T8, and the switching circuit 45 is caused to operate the trip circuit 47.

If, because of the limiting action of the diodes D1 and D2 and/or the saturation of the circuit elements, the voltage at the point 34 is not more than twice the voltage at the point 36 then the test circuit arrangement continues to operate. The new peak value of the positive going part of the input signal is again represented by the voltage at the point 34 nd at a time T10, the next time that the multivibrator 41 returns to its stable state, the switching circuit is primed by the output of the comparator 38, having a polarity that is given by the voltage at the point 34 minus half of the voltage at the point 36. The voltage at the point 34 (FIG. 5(d)) is much smaller than that at the point 36 (FIG. 5(e)) and the output of the comparator 38 is negative, thus priming the switching circuit 46 and causing the trailing edge of the multivibrator pulse to operate the trip circuit 47 at the time T10, within one cycle of the input waveform after the breakdown.

Referring again to FIG. 1, the functioning of the testing circuit 20 may be checked by operating a push-button switch 50 and placing a low value resistor R14 in parallel with the resistor R3 thereby applying an artificially low input signal commensurate with an insulation breakdown in the test object.

It will be appreciated that the unstable periods of the multivibrators 40 and 41 are chosen for use with a high voltage supply of a particular frequency. If the test circuit arrangement is to be operated subsequently with a supply of a different frequency then the unstable periods of the multivibrators must be changed to remain between three-quarters and one cycle of the input signal at the new frequency.

The circuit as described above causes the test ciruit arrangement to shut down in the event of a drop of one half in the value of consecutive peaks of the input signal. However, by doubling the values of the resistors R5 and R6, for example, the voltage at the points 35 and 37 would be two-thirds of the voltages at the points 34 and 36 respectively and for the output of the comparators to be negative, the peak value of the input signal need only drop by one-third. Replacement of the resistor R4-R5 and R6-R7 by variable components would enable peak level ratios of any predetermined value to cause the operation of the trip circuit 47.

What I claim is:

1. A high voltage series resonant testing circuit arrangement comprising storage means responsive to an applied alternating signal for storing together two successive peak values of the alternating signal, comparator means for comparing the ratio of one stored peak value of a half cycle to that of the stored immediately-preceding half cycle with a predetermined fraction, clearing means adapted to clear the stored peak value of said immediately preceding half cycle after each comparison to enable the next following peak value to be stored, and output means operatively coupled to the comparator means to provide an output signal in response to the detection of such a ratio of peak values of less than the predetermined fraction.

2. A testing circuit arrangement as claimed in claim 1 in which the storage means includes two rectifiers, different rectifiers being arranged to conduct half cycles of the alternating signal of different polarity and, associated with each rectifier, a storage element for storing repetitively the peak values of the half cycles of the alternating signal conducted by the rectifier.

3. A testing circuit arrangement as claimed in claim 2 in which each storage element comprises a capacitor.

4. A testing circuit arrangement as claimed in claim 1 in which the clearing means includes two monostable multivibrators, different multivibrators being associated with half cycles of the alternating signal of different polarities, each multivibrator being arranged to be in an unstable state in response to the receipt by the testing circuit arrangement of a half cycle of the alternating signal of the associated polarity and to produce a signal upon the transference of the multivibrator at a time between three-quarters and a complete period of the input signal from said unstable state to a stable state.

5. A testing circuit arrangement as claimed in claim 4 in which the output means comprises two switching circuits, different switching circuits being associated with half cycles of the alternating signal of different polarities, each switching circuit being energised in response to receipt of signals both from the comparator means, and indicative of the detection of a ratio of stored peak values of less than the predetermined fraction, and from the associated multivibrator, and indicative of the transference of the multivibrator from said unstable state to a stable state.

6. A testing circuit arrangement as claimed in claim 1 in which the comparator means comprises two differential amplifiers, different differential amplifiers being associated with half cycles of the alternating signal of different polarities, each differential amplifier having two inputs with different inputs being arranged to receive from the storage means signals having a parameter magnitude representing the stored peak values of the half cycles of different polarities, and each differential amplifier being arranged to provide a signal in response to a ratio of the stored peak values of less than said predetermined fraction.

* * * * *

UNITED STATES PATENT OFFICE
CERTIFICATE OF CORRECTION

Patent No. 3,763,399          Dated October 2, 1973

Inventor(s) Raymond Vaughan Jenkins

It is certified that error appears in the above-identified patent and that said Letters Patent are hereby corrected as shown below:

Cover page, after item [21] insert --
[30] Foreign Application Priority Data
    August 18, 1971   Great Britain    38860/71--.
Item [57], line 6, "immediately preceding" should read
--immediately-preceding--. Column 7, line 50, "immediately preceding" should read --immediately-preceding--. Column 8, line 44, after "means" insert a comma (,).

Signed and sealed this 19th day of March 1974.

(SEAL)
Attest:

EDWARD M. FLETCHER, JR.          C. MARSHALL DANN
Attesting Officer                Commissioner of Patents